May 9, 1933.   V. G. APPLE   1,908,101
VENTILATED MOTOR
Filed April 30, 1930
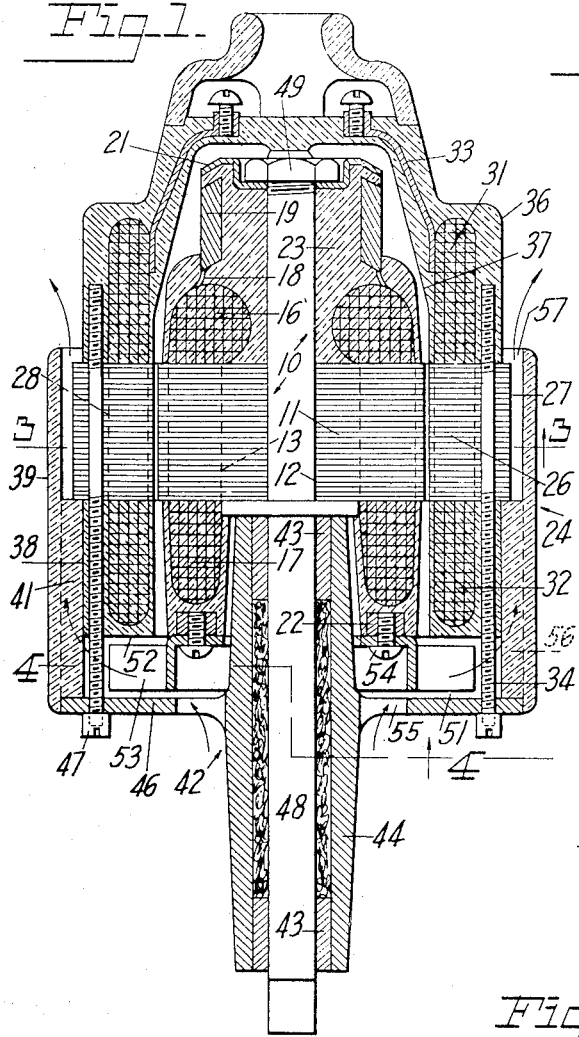
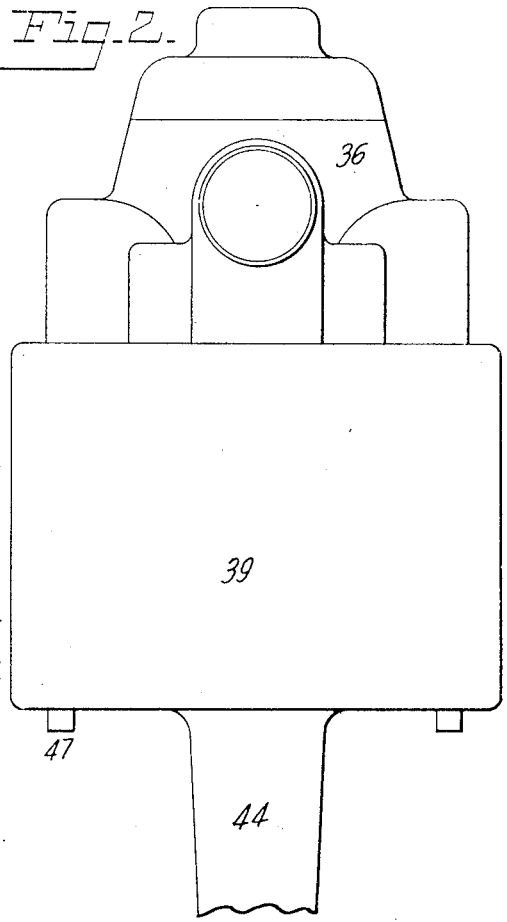
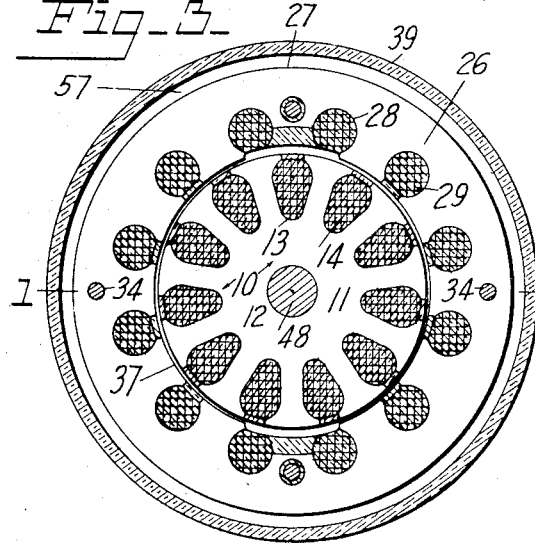
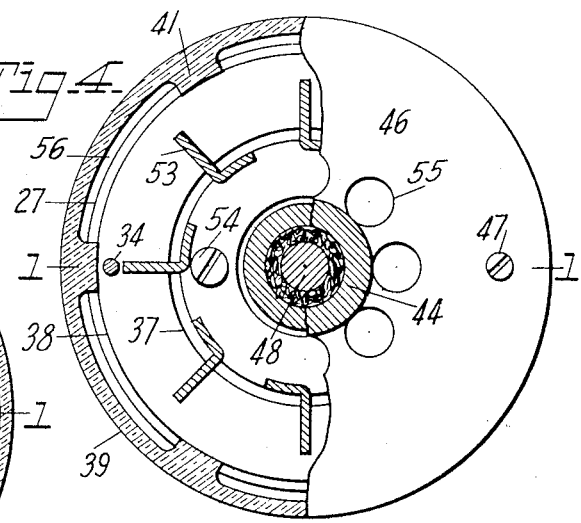
INVENTOR
Vincent G. Apple Patented May 9, 1933

1,908,101

UNITED STATES PATENT OFFICE

VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

VENTILATED MOTOR

Application filed April 30, 1930. Serial No. 448,647.

This invention relates particularly to motors of the class which contain as part of their structure means for moving a cooling fluid over the surfaces which become heated in operation.

An object of the invention is to increase the overload capacity of a given sized motor by providing improved means for transferring the heat from the windings in which it is generated to the surfaces over which the cooling fluid is to be passed.

Another object is to protect a user of the motor from accidental contact with the surface of the motor which carries the greatest heat.

I attain these objects in the structure embodying my invention hereinafter described and shown in the accompanying drawing, wherein—

Fig. 1 is a vertical axial section taken at 1—1 of Figs. 3 and 4.

Fig. 2 is an elevation of the motor.

Figs. 3 and 4 are transverse sections taken at 3—3 and 4—4 respectively of Fig. 1.

Similar numerals refer to similar parts throughout the several views.

The armature 10 has a magnetizable core 11 composed of laminæ 12. A series of winding apertures 13 pass lengthwise through core 11 near its periphery. A winding 14 passes through apertures 13 forming winding heads 16 and 17. Leads 18 emanate from winding head 16, and a series of commutator segments 19 are electrically connected one to each lead. A metal end protecting plate 21 is spaced apart from the ends of segments 19. At the other end tapped metal inserts 22 are spaced apart from the winding head 17. Inserts 22 may be knurled or otherwise roughened on their outside diameter.

The foregoing enumerated parts of the armature are all held in their respective positions by the integral mass 23 of insulation. This insulation is of a cementitious nature and of a kind having as high thermal conductivity as may be obtained, and is shaped as shown by placing the several parts of the armature in a mold having additional space for the insulation and filling said additional space with the insulation while it is in a fluid state then afterward hardening it before removing the armature from the mold. In this way the one integral mass 23 of heat conducting insulation extends between and about the segments 19, into the innermost recesses of the winding both where the winding is contained in the core apertures 13 and where it forms heads 16 and 17 at the ends of the core, and completely around the winding to enclose it, and form an impervious jacket around it. The segments 19, the plate 21 and the inserts 22 have no other means of support than the insulation mass 23, and while the winding receives a part of its support from the core, the coil heads 16 and 17 also receive their support and are held in a definite shape by the insulation mass.

In the field structure 24 a core 26 is composed of laminæ 27. A series of winding apertures 28 extend lengthwise through the core near its inner diameter. Field winding 29 is laid in apertures 28 and extends beyond the core at both ends, forming the winding heads 31 and 32. Rigid line terminals 33 are electrically connected to the ends of the field winding as shown. The long studs 34 extend through openings in core 26 and are threaded at both ends.

The foregoing field structure details are all held in their relative positions as shown by the integral mass 36 of insulation. This insulation is preferably of the same nature as the mass 23 of the armature and is placed and shaped by a similar process, whereby it penetrates the innermost recesses of the winding, both where it is contained in the core apertures 28 and in the winding heads 31 and 32, surrounding the winding and the terminals 33 and roughened portions of the studs 34, composing an impervious covering for the winding and forming a hollow housing having a cylindrical opening 37 within which the armature may revolve.

The portion 38 of housing 36 which surrounds winding head 32 is cylindrical and slightly smaller in diameter than the core 26 and is concentric with the core and with the armature opening 37. A cylindrical shell 39, composed preferably of a material having as low thermal conductivity as may be had, surrounds the core 26 and the cylindrical part 38 of housing 36 at a slight distance therefrom, being held concentrically spaced apart therefrom by the series of ribs 41 extending inwardly from the inner diameter of the shell to cylindrical part 38.

A bearing head 42 carries two spaced apart bearing bushings 43 in its hub 44. The flange 46 extends outwardly from hub 44 and is concentrically located by shell 39. The ribs 41 are of such length as to reach from the end of core 26 to flange 46 and hold the flange at proper distance from the core when the blind nuts 47 are drawn up on studs 34. Shaft 48 is rotatably supported in bushings 43 and the armature 10 is secured in overhung fashion on the upper end of the shaft by the nut 49.

By the proper determination of the length of ribs 41 a space 51 is left between the end 52 of the housing 36 and the flange 46. A sheet metal fan 53 occupies the space 51 and is secured to the armature 10 for rotation therewith by screws 54 extending into inserts 22. As the fan rotates air is drawn into openings 55 through flange 46 and passes first through the spaces 56, Fig. 4, then through the space 57 between core 26 and shell 39.

Because of the thermal conductivity of the insulation masses 23 and 36, and because of the fact that integral portions of the insulation masses extend into the interior of the windings, heat is rapidly brought from the windings to the surfaces over which the fan 53 moves its current of air, so that the heat generated by the windings is more rapidly dissipated than in a motor having conventional cooling means.

Having described an embodiment of my invention, I claim,

1. The combination, in an electric motor, of a bearing head at one end of said motor, a bearing hub extending axially from said bearing head part way into said motor, a rotatable shaft extending from said hub farther into said motor, a magnetizable armature core on said shaft within said motor at the end of said hub, a winding on said core comprising an annular armature winding head extending axially from said core closely surrounding the inner end of said hub, a ring of insulating material extending axially from the end of said core closely surrounding said hub, pressure molded through and about the turns of said winding and winding head and supported solely thereby, and a fan secured to the end of said ring closely surrounding said hub, said fan being supported and driven solely by said ring.

2. The structure defined in claim 1 with metal inserts imbedded in the ring of insulation and screws extending through the fan into said inserts securing said fan to said ring.

3. The structure defined in claim 1 with a cylinder extending axially from the outer diameter of said bearing head around said armature core leaving an annular space therebetween, an annular field core within said annular space closely surrounding said armature core but leaving a smaller annular space between said field core and said cylinder, a field winding comprising an annular field winding head extending axially from the field core around the said winding head of the armature, an annulus of insulating material pressure molded through and about the turns of said field winding and said field winding head, said annulus being of smaller diameter than said field core, a series of ribs extending axially on the inside of said cylinder between said bearing head and said field core, said ribs fitting closely to said annulus, and fastening means drawing the ends of said ribs tightly against the end of said field core.

In testimony whereof I affix my signature.
VINCENT G. APPLE.